United States Patent Office 2,759,955
Patented Aug. 21, 1956

2,759,955

PROCESS FOR THE ESTERIFICATION OF HIGHER FATTY ACIDS

Frederic Francois Albert Braconier, Plainevaux, and Raymond Arnould, Liege, Belgium, assignors to Societe Belge de l'Azote et des Produits Chimiques du Marly, a company of Belgium No Drawing. Application July 15, 1954,
Serial No. 443,712

Claims priority, application Belgium May 5, 1954

5 Claims. (Cl. 260—410.9)

This invention relates to a process for the continuous preparation without the use of catalysts, of alkyl esters, and more specifically, of methyl esters from monocarboxylic aliphatic acids, containing more than 6 carbon atoms, these acids being hereinafter referred to as "higher fatty acids."

As it is known, fatty acids, such as acetic acid, can be esterified with substantial yields, without the use of catalysts, by treatment with alcohols at temperatures of from 150 to 200° C. (from approx. 302 to 392 deg. F.) and at a pressure sufficient to maintain the reaction mixture in a liquid state, the pressure hardly exceeding 20 at. (about 300 p. s. i.) in the processes which are customarily employed.

This technique, when applied to higher fatty acids, under similar operating conditions, which would be a desirable procedure because it avoids some of the inconveniences of the catalytic process, does not give satisfactory results, from an economic standpoint, as compared with the catalytic processes, because of the insufficient speed and rate of esterification.

Nevertheless the non-catalytic esterification of higher fatty acids has been applied in special cases, where other factors than the speed of operations were important. Thus, in accordance with the U. S. Patent No. 2,411,536, relating to "tall-oil," a by-product in the manufacture of paper pulp from conifers, the higher fatty acids are separated selectively by esterification from resinous acids without using catalysts which under the above operating conditions of temperatures around 200° C. (392 deg. F.) and pressures not exceeding 15 at. (225 p. s. i.) withstand esterification. However, since this process has mainly the purpose of separating the two kinds of organic acids contained in the "tall-oil," these operating conditions, if adopted for the esterification generally of higher fatty acids, would result in a slow reaction rate and low esterification yields.

On the other hand, where the higher fatty acids, e. g., derived from animal or vegetable fats or oils, are esterified, preferably by methanol, in order, for example, to be thereafter subjected to hydrogenation, to produce alcohols corresponding to the acids used in this operation, it is important, from a technical as well as from an economic viewpoint, that the non-catalytic esterification be carried out in such a manner as to attain a much smaller duration of the chemical reaction, and greater yields of methyl or other esters.

In accordance with this invention, such a result can be attained without the use of catalysts by subjecting the higher fatty acids with an alcohol to a pressure and temperature that would not be lower than the critical temperature and pressure of the employed alcohol.

Actually, it has been established that by reaching and going beyond the critical points of this alcohol, the rate of esterification of the processed higher fatty acids is abruptly and unexpectedly increased.

This increase in the esterification yield is accompanied by a noticeable speed-up of the reaction.

Where the higher fatty acids, subjected to esterification, are to be converted, by hydrogenation into the corresponding alcohols, the preliminary conversion into alkyl esters with methyl alcohol has proved to be advantageous.

Among the advantages of the process of the invention as compared with the usual processes, which are carried out under operating conditions below the critical points of the employed alcohol, is the fact that a considerably smaller excess of alcohol may be used to produce nevertheless a high ester yield, in accordance with the law of mass action, because actually, the excess alcohol exercises in this process a rather small influence, on the speed, as well as on the yield. Also, owing to the speed of the reaction the flow of the reagents subjected to the esterification may be increased, without producing any practical decrease in the rate of esterification of the processed higher fatty acids. Therefore, from a practical point of view, higher yields per hour can be obtained with equipment having a smaller capacity, and the installation costs can thus be reduced even though it is necessary to use materials that would resist high pressures and temperatures.

In order to show the abrupt and fast increase of the esterification yield of the higher fatty acids when processed under operating conditions as described in this invention, the results of a series of comparative esterification tests of fatty acids derived from tallow with methanol are given below the aforesaid alcohol having a critical temperature of 240° C. (approx. 464 deg. F.) and a critical pressure of 78.7 at. (81 kg./sq. cm., or 1180.5 p. s. i.).

These tests, the results of which are indicated in Table I, were conducted with a mixture of 62 parts by weight of the fatty acids of tallow and 38 parts of methanol, the mixture being subjected, at different temperatures, to a pressure of 100 kg./sq. cm., at a volumetric speed of 10 liters of fatty acids per hour, per liter of the capacity of the reactor.

TABLE I

| Temperature | Esterification Rates of the Fatty Acids, percent |
|---|---|
| 200° C. (392 deg. F.) | 47 |
| 230° C. (446 deg. F.) | 54 |
| 260° C. (500 deg. F.) | 80 |
| 300° C. (572 deg. F.) | 87 |
| 330° C. (626 deg. F.) | 91 |
| 350° C. (662 deg. F.) | 94 |

The above table shows that the esterification rates increase very rapidly after the critical temperature of methanol is reached and exceeded, between the temperatures of 230 and 260° C. (446 and 500 deg. F.), and that they continue to increase, until reaching a maximum at about 330° C. (626 deg. F.). Beyond this temperature, the esterification yields practically do not increase any more during a further range of increased temperatures, and thereafter commence to decrease at the adopted volumetric speed, because of the decomposition by heat of the produced esters.

The high efficiency of the process in accordance with this invention, as compared with non-catalytic processes operating below the critical points of the employed alcohol, is apparent not only in the yields, which, in the case of methanol may attain, and even go beyond 95%, but mainly also in the fact that, without lowering the yields, the flow of the reagents, i. e., the volumetric speed at which the reaction mixture passes through the reactor, may be changed and increased within large limits. This is clearly evident from the results, as listed in Table II, of a series of comparative tests executed with different volumetric speeds at a temperature of 330° C. (626 deg. F.) and a pressure of 100 kg./sq. cm. with a mixture consisting of 62 parts of tallow fatty acids and of 38 parts of methanol.

TABLE II

| Volumetric Speed | Esterification Rates of Fatty Acids, percent |
|---|---|
| 0.5 | 95.8 |
| 1 | 95.9 |
| 5 | 95.4 |
| 10 | 94 |

Since according to the invention, it is possible to alter the flow of the reagents within large limits, without, practically, any adverse influence on the esterification rates, the volumetric speed can be therefore selected in proportion to the reaction temperature adopted in a given case, so that the reaction mixture can be maintained at such temperature during a period of time that is sufficient to obtain a maximum yield, without however, producing the decomposition of the substances which are being subjected to the reaction by heating them for an excessive length of time.

The last series of comparative tests, the results of which are indicated in Table III, shows the evident advantage of the process with respect to the comparatively small excess of alcohol which is necessary to obtain satisfactory esterification yields, at volumetric speeds which are feasible industrially.

To this effect, two different mixtures consisting, respectively, of 76 parts of fatty acids derived from tallow and 24 parts of methanol (mixture 1), and of 62 parts of fatty acids of tallow and 38 parts of methanol (mixture 2, identical with the mixture used for tests according to Tables I and II, wherein the quantity of methanol employed was about 5.5 times more than the quantity which is stoichiometrically necessary for the reaction) were treated at different temperatures, and at a pressure of 100 kg./sq. cm. and a volumetric speed of 5 liters of fatty acids per hour and per liter of the capacity of the reactor.

TABLE III

| Temperature | Esterification Rates | |
|---|---|---|
| | Mixture 1 | Mixture 2 |
| | Percent | Percent |
| 260° C. (500 deg. F.) | 78 | 80 |
| 300° C. (572 deg. F.) | 84 | 87.5 |
| 330° C. (626 deg. F.) | 92 | 95.4 |

According to this table, it will be seen that the esterification rates, under the operating conditions as described in accordance with this invention, are, to a large extent, independent of the amount of excess alcohol. Practical experience has shown that the weight ratio of fatty acids and alcohol may vary from less than 50:50 to 85:15, thus providing the process with great adaptability of operating conditions.

In industrial practice, the process is therefore essentially applied by subjecting a mixture of higher fatty acids and a lower aliphatic alcohol for a sufficiently long period of time, to a temperature and pressure which are not lower than the critical points of the alcohol which is employed for that purpose, in a quantity at least equal to the stoichimetrically required quantity. The required operating conditions may be secured employing any apparatus which is arranged so that the reaction mixture can be maintained therein for a sufficient length of time, at the required temperatures and pressures, in order to enable the chemical reaction to produce maximum yields.

For this purpose, a metal tube may be used, which is heated to a temperature, at least equal to the critical temperature of the employed alcohol, and the mixture of fatty acids and alcohol is introduced into the tube at an appropriate rate and under a pressure which is at least equal to the critical pressure of the employed alcohol, so as to produce the chemical reaction of the employed alcohol in a ratio which is at least equal and preferably slightly higher than the quantity which is stoichiometrically necessary for the reaction.

At the tube outlet, the excess alcohol and the water produced in the reaction are separated from the resulting esters, most suitably by evaporation by means of flashing and thereafter, the esters are subjected to a rectifying process, so as to retain the small percentage of non-esterified higher fatty acids. In the event that these esters are to pass through the hydrogenation process, this rectification could possibly be omitted, because the comparatively small content of remaining fatty acids in the reactive mixture hardly impedes the subsequent hydrogenation of the esters.

The process according to the invention is mainly distinguished by a considerable adaptability of the operating conditions, which may be adjusted according to the particular circumstances of planned operations or with a view to conditions which must be considered. The esterification rate and the reaction speed are not only independent, to a large measure, of the other operating conditions, such as the flow and the ratio of the reagents in the reaction mixture, but also of the nature of the substances which are used in the reaction. Actually, the process may be applied for the esterification with the aid of methanol or near homologs thereof of all kinds of fatty acids, whether saturated or not, derived, e. g., from animal or vegetable fats or oils, or obtained through the oxidation of paraffins.

The following examples, illustrate the process of the invention without however, restricting this process, neither with respect to the particular substances used or with regard to the specifically described method of operation:

*Example 1*

A mixture of 62 parts by weight of coconut oil acids and 38 parts of methanol was continuously introduced, at a volumetric speed of from 10 to 12 liters of the mixture per hour per liter of the capacity of the reactor, into a steel tube having a length of 4 meters, an outside diameter of 35 mm. and an inside diameter of 17 mm., which was heated from the outside.

Compressed to a pressure of 100 kg. per sq. cm., the mixture, while passing through the tube, was heated to a temperature of about 250° C. (482 deg. F.).

At the outlet of the tube, the reaction mixture was flashed in order to eliminate the excess methanol and the water formed during the reaction.

The obtained methyl esters did not contain more than 7% of non-converted higher fatty acids.

*Example 2*

A mixture of fatty acids, derived from tallow, and methanol having the weight ratio of 62 and 38 was passed at a temperature of 265° C. (509 deg. F.) through the same tube as described in Example 1, at a pressure of 550 atmospheres (about 8250 p. s. i.) and a volumetric speed of 6, based on liters of fatty acids per hour per liter of the capacity of the reactor.

A conversion rate of 96% of methyl esters from these acids was attained.

*Example 3*

A mixture of tallow fatty acids and butanol with the weight ratio of 50:50 was passed at a temperature of 300° C. (572 deg. F.) through a tube having the same dimensions as the tube described in Example 1, at a pressure of 100 atmospheres (approx. 1500 p. s. i.) and a volumetric speed of 1, based on liters of fatty acids per liter of the capacity of the reactor per hour.

The obtained esterification yield was from 88 to 89 per cent.

*Example 4*

A mixture consisting of 55 parts by weight of fatty acids derived from tallow and 45 parts of isopropyl alcohol was treated in the same tube as described in the foregoing examples, at a temperature of 280° C. (536 deg. F.) under a pressure of 100 atmospheres (about 1500 p. s. i.) and a volumetric speed of 0.7, based on liters of fatty acids per liter of the reactor.

The thus obtained esterification rate was from 77 to 78%.

What we claim and desire to protect by Letters Patent is:

1. A continuous non-catalytic process for the esterification of aliphatic monocarboxylic acids containing more than 6 carbon atoms, which comprises reacting said acids with an aliphatic alcohol containing one to six carbon atoms at a temperature and pressure at least equal to the critical temperature and pressure of said alcohol, the amount of said alcohol employed being at least equal to the amount stoichiometrically required to react with said acids, separating excess alcohol from the reaction mixture by flashing and separating the resulting esters from the remaining acids by distillation.

2. A continuous non-catalytic process for the esterification of aliphatic monocarboxylic acids containing more than 6 carbon atoms, which comprises passing said acids and an aliphatic alcohol containing one to six carbon atoms, in an amount at least equal to the amount stoichiometrically required to react with said acids, through a reaction space, at a temperature and pressure at least equal to the critical temperature of said alcohol at a volumetric rate of from 1 to 20 volumes of acid per hour per volume of reaction space, separating excess alcohol from the reaction mixture by flashing and separating the resulting esters from the remaining acids by distillation.

3. A continuous non-catalytic process for the esterification of aliphatic monocarboxylic acids containing more than 6 carbon atoms, which comprises passing said acids and an aliphatic alcohol containing one to six carbon atoms, in an amount at least equal to the amount stoichiometrically required to react with said acids, through a reaction space, at a temperature and pressure at least equal to the critical temperature of said alcohol at a volumetric rate of from 5 to 10 volumes of acid per hour per volume of reaction space, separating excess alcohol from the reaction mixture by flashing and separating the resulting esters from the remaining acids by distillation.

4. A continuous non-catalytic process for the esterification of aliphatic monocarboxylic acids containing more than 6 carbon atoms, which comprises passing said acids and methanol, in an amount at least equal to the amount stoichiometrically required to react with said acids, through a reaction space at a temperature of at least 240° C. and a pressure of at least 81 kg. per sq. cm. at a rate of from 1 to 20 volumes of acids per hour volume of reaction space, separating excess methanol from the reaction mixture by flashing and separating the resulting esters from the remaining acids by distillation.

5. A continuous non-catalytic process for the esterification of aliphatic monocarboxylic acids containing more than 6 carbon atoms, which comprises passing said acids and methanol, in an amount at least equal to the amount stoichiometrically required to react with said acids, through a reaction space at a temperature of between 240° C. to 350° C., and a pressure of at least 81 kg. per sq. cm. at a rate of from 5 to 10 volumes of acids per hour per volume of reaction space separating excess methanol from the reaction mixture by flashing and separating the resulting esters from the remaining acids by distillation.

References Cited in the file of this patent

UNITED STATES PATENTS 2,644,009　　Cash et al. _____ June 30, 1953

OTHER REFERENCES

Ralston: Fatty Acids and Their Derivatives, John Wiley & Sons, New York City, 1948, page 494.